(12) United States Patent
Bonnat

(10) Patent No.: US 8,976,046 B2
(45) Date of Patent: Mar. 10, 2015

(54) METHOD AND SYSTEM FOR A MEMS DETECTOR THAT ENABLES CONTROL OF A DEVICE USING HUMAN BREATH

(76) Inventor: Pierre Bonnat, Las Vegas, NV (US)

(*) Notice: Subject to any disclaimer, the term of this patent is extended or adjusted under 35 U.S.C. 154(b) by 1430 days.

(21) Appl. No.: 12/055,999

(22) Filed: Mar. 26, 2008

(65) Prior Publication Data

US 2009/0241686 A1    Oct. 1, 2009

(51) Int. Cl.
*H03K 17/94*    (2006.01)
*H03M 11/00*    (2006.01)

(52) U.S. Cl.
USPC .................................. 341/34; 341/20; 341/21

(58) Field of Classification Search
CPC .................. B81B 2201/0264; B81C 1/00246; G01L 9/0073
See application file for complete search history.

(56) References Cited

U.S. PATENT DOCUMENTS

| | | |
|---|---|---|
| 4,207,959 A | 6/1980 | Youdin et al. |
| 4,433,685 A | 2/1984 | Giorgini et al. |
| 4,521,772 A | 6/1985 | Lyon |
| 4,561,309 A | 12/1985 | Rosner |
| 4,713,540 A | 12/1987 | Gilby et al. |
| 4,746,913 A | 5/1988 | Volta |
| 4,929,826 A | 5/1990 | Truchsess et al. |
| 5,341,133 A | 8/1994 | Savoy et al. |
| 5,378,850 A | 1/1995 | Tumura |
| 5,422,640 A | 6/1995 | Haley |
| 5,603,065 A | 2/1997 | Baneth |
| 5,740,801 A | 4/1998 | Branson |
| 5,763,792 A | 6/1998 | Kullik |
| 5,835,077 A | 11/1998 | Dao |
| 5,889,511 A | 3/1999 | Ong et al. |
| 5,907,318 A | 5/1999 | Medina |
| 6,012,336 A * | 1/2000 | Eaton et al. ..................... 73/754 |
| 6,040,821 A | 3/2000 | Franz |

(Continued)

FOREIGN PATENT DOCUMENTS

| | | |
|---|---|---|
| CN | 1352766 | 6/2002 |
| CN | 1394276 | 1/2003 |

(Continued)

OTHER PUBLICATIONS

European Patent Office, International Search Report, in PCT/US03/32203, dated Aug. 24, 2005.

(Continued)

*Primary Examiner* — Robert T. Crow
(74) *Attorney, Agent, or Firm* — McAndrews, Held & Malloy, Ltd.

(57) ABSTRACT

Methods and systems for a MEMS detector that enables control of a device using human breath are disclosed and may include detecting air flow caused by human breath via a microelectromechanical systems (MEMS) detector, which may include deflectable members operable to detect the movement of air. The deflection of the members may be limited via a spacer within the MEMS detector. The amount of deflection may be determined by measuring reflected light signals, piezoelectric signals, capacitance changes, or current generated by the deflection in a magnetic field. Output signals may be generated based on the detected movement. The MEMS detector may include a substrate, a spacer, and the MEMS deflectable members. The substrate may include a ceramic material and/or silicon, and may include embedded devices and interconnects. An integrated circuit may be electrically coupled to the substrate. Air flows may be directed out of the side of the MEMS detector.

22 Claims, 12 Drawing Sheets

No deflection (rest position)

Deflection

(56) References Cited

U.S. PATENT DOCUMENTS

| | | | |
|---|---|---|---|
| 6,213,955 | B1 | 4/2001 | Karakasoglu et al. |
| 6,261,238 | B1 | 7/2001 | Gavriely |
| 6,323,846 | B1 | 11/2001 | Westerman |
| 6,396,402 | B1 | 5/2002 | Berger et al. |
| 6,421,617 | B2 | 7/2002 | Felsenstein |
| 6,516,671 | B2 | 2/2003 | Romo et al. |
| 6,574,571 | B1 | 6/2003 | Bonnat |
| 6,664,786 | B2 | 12/2003 | Kretschmann |
| 7,053,456 | B2 | 5/2006 | Matsuo |
| 7,739,061 | B2 * | 6/2010 | Bonnat .............. 702/48 |
| 2003/0208334 | A1 | 11/2003 | Bonnat |
| 2004/0017351 | A1 | 1/2004 | Bonnat |
| 2005/0127154 | A1 | 6/2005 | Bonnat |
| 2005/0218488 | A1 | 10/2005 | Matsuo |
| 2005/0268247 | A1 | 12/2005 | Baneth |
| 2006/0118115 | A1 | 6/2006 | Cannon |
| 2006/0142957 | A1 | 6/2006 | Bonnat |
| 2006/0252608 | A1 * | 11/2006 | Kang et al. .......... 482/84 |
| 2007/0048181 | A1 | 3/2007 | Chang et al. |
| 2007/0180917 | A1 * | 8/2007 | Farnet et al. .......... 73/700 |
| 2007/0249082 | A1 | 10/2007 | Hanaoka et al. |

FOREIGN PATENT DOCUMENTS

| | | |
|---|---|---|
| CN | 1677705 | 10/2005 |
| JP | 10320108 | 12/1998 |
| JP | 2001-4470 | 1/2001 |
| JP | 2004-280301 | 10/2004 |
| JP | 2005-63101 | 3/2005 |
| JP | 2005-235020 | 9/2005 |
| JP | 2007-124449 | 5/2007 |
| JP | 2007-203420 | 8/2007 |
| JP | 2002-366275 | 12/2012 |
| WO | 00/48066 | 8/2000 |
| WO | 01/50106 | 7/2001 |
| WO | WO 2008/030976 | 3/2008 |

OTHER PUBLICATIONS

European Patent Office, Preliminary Examination Report, in PCT/US03/32203, dated Mar. 29, 2006.

United States Patent and Trademark Office, Office Action, in U.S. Appl. No. 10/530,946, dated Oct. 5, 2007.

International Search Report and Written Opinion for International Patent Application Serial No. PCT/US09/38397, mailed May 26, 2009.

International Search Report and Written Opinion for International Patent Application Serial No. PCT/US09/038395, mailed May 27, 2009.

International Search Report and Written Opinion for International Patent Application Serial No. PCT/US2009/038384, mailed Jun. 10, 2009.

European Patent Office, Communication with extended European search report in Application No. 09724750.6, dated Jan. 30, 2012 (6 pages).

First Office Action corresponding to Chinese Patent Application No. 200980119385.0, mailed Jun. 21, 2012 (with unofficial translation).

Japanese Patent Office, Notice of Reason for Rejection in Japanese Application No. 2011-502055, dated Aug. 2, 2013 (4 pages).

Office Action issued May 26, 2014 re: JP 2011-502055, English translation (3 pages).

International Preliminary Report on Patentability dated Oct. 7, 2010 in International Application No. PCT/US2009/038395.

* cited by examiner

METHOD AND SYSTEM FOR A MEMS DETECTOR THAT ENABLES CONTROL OF A DEVICE USING HUMAN BREATH

CROSS-REFERENCE TO RELATED APPLICATIONS/INCORPORATION BY REFERENCE

This application also make reference to:
U.S. application Ser. No. 12/056,164, filed on Mar. 26, 2008, now published as 2008/0177404;
U.S. application Ser. No. 12/056,203 filed on Mar. 26, 2008, now published as 2009/0082884;
U.S. application Ser. No. 12/056,171 filed on Mar. 26, 2008, now published as 2009/0249202;
U.S. application Ser. No. 12/056,061 filed on Mar. 26, 2008, now published as 2009/0244003; and
U.S. application Ser. No. 12/056,187 filed on Mar. 26, 2008, now published as 2009/0247222.

Each of the above referenced applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to controlling an electronic device. More specifically, certain embodiments of the invention relate to a method and system for a MEMS detector that enables control of a device using human breath.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology.

With the development of wireless technology, wireless headphones have also become more and more prevalent. Bluetooth headgear, headsets and/or earpieces have expanded significantly in usage as more cellular phone users have discovered the ease of use with hands-free operation, not only in automotive applications, but in any application where hands-free operation is preferred.

While voice connections fulfill the basic need to communicate, and mobile voice connections continue to filter even further into the fabric of every day life, the mobile access to services via the Internet has become the next step in the mobile communication revolution. Currently, most mobile devices are equipped with a user interface that allows users to access the services provided via the Internet. For example, some mobile devices may have browsers and software and/or hardware buttons may be provided to enable navigation and/or control of the user interface. Some mobile devices such as Smartphones are equipped with touch screen capability that allow users to navigate or control the user interface via touching with one hand while the device is held in another hand.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a MEMS detector that enables control of a device using human breath, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a MEMS detector that enables control of a device using human breath. Exemplary aspects of the invention may comprise detecting movement of air caused by expulsion of human breath via a microelectromechanical systems (MEMS) detector. The MEMS detector may comprise one or more deflectable or moveable members operable to detect the movement of air caused by the expulsion of human breath. The deflection of the deflectable or movable members may be limited via a spacer within the MEMS detector. The amount of deflection of the deflectable members may be determined by measuring light signals reflected off of the MEMS deflectable members, measuring piezoelectric signals generated by the deflection of the deflectable members, measuring capacitance changes generated by the deflection of the deflectable members, or by measuring current generated by the deflection of the deflected members in a magnetic field. One or more output signals may be generated based on the detected movement. The MEMS detector may comprise a substrate, a spacer, and the MEMS deflectable members. The substrate may comprise a ceramic material and/or silicon, and may comprise embedded devices and interconnects. The embedded devices may be passive devices such as inductors, resistors and/or capacitors. An integrated circuit may be electrically coupled to the substrate. Air flows may be directed out the side of the MEMS detector.

Figure 1:
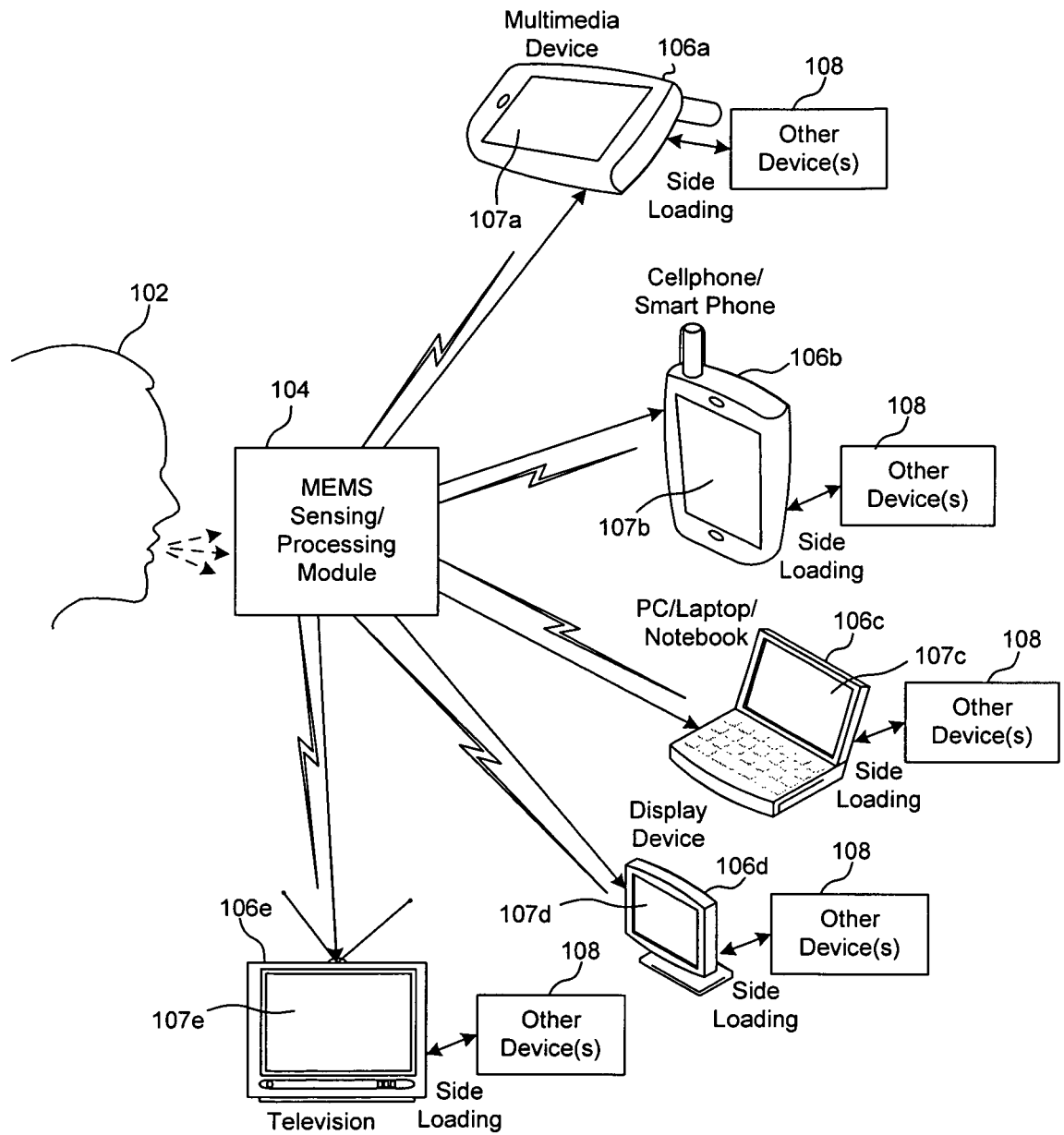
FIG. 1 is a block diagram of an exemplary system for controlling a user interface of a plurality of devices using human breath, in accordance with an embodiment of the invention.

FIG. 1 is a block diagram of an exemplary system for controlling a user interface of a plurality of devices using human breath, in accordance with an embodiment of the invention. Referring to FIG. 1, there is shown a user 102, a micro-electro-mechanical system (MEMS) sensing and processing module 104, and a plurality of devices to be controlled, such as a multimedia device 106a, a cellphone/smartphone/dataphone 106b, a personal computer (PC), laptop or a notebook computer 106c, a display device 106d and/or a television (TV)/game console/other platform 106e. The multimedia device 106a may comprise a user interface 107a, the cellphone/smartphone/dataphone 106b may comprise a user interface 107b, and the personal computer (PC), laptop or a notebook computer 106c may comprise a user interface 107c. Additionally, the display device 106d may comprise a user interface 107d and the television (TV)/game console/other platform 106e may comprise a user interface 107e. Each of the plurality of devices to be controlled may be wired or wirelessly connected to a plurality of other devices 108 for side loading of information and/or communication of information, for example, peer-to-peer and/or network communication. Exemplary other devices 108 may comprise game consoles, immersive or 3D reality devices, and/or telematic devices. Telematic devices refers to devices comprising integrated computing, wireless communication and/or global navigation satellite system devices, which enables sending, receiving and/or storing of information over networks.

The MEMS sensing and processing module 104 may comprise suitable logic, circuitry and/or code that may be enabled to detect movement caused by expulsion of human breath by the user 102. In response to the detection of movement caused by expulsion of human breath, the MEMS sensing and processing module 104 may be enabled to generate one or more controls signals. The MEMS sensing and processing module 104 may comprise one or more detection devices or detectors, such as one or more sensors, sensing segments and/or members that may be operable to sense the kinetic energy generated by the expulsion of the human breath and accordingly generate the one or more control signals. The generated one or more control signals may be enabled to control a user interface of one or more of a plurality of devices, such as the user interface 107a of the multimedia device 106a, the user interface 107b of the cellphone/smartphone/dataphone 106b, the user interface 107c of the PC, laptop or a notebook computer 106c, the user interface 107d of the display device 106d, the user interface 107e of the TV/game console/other platform 106e, and the user interfaces of the mobile multimedia player and/or a remote controller. One exemplary embodiment of a user interface is a graphical user interface (GUI). Any information and/or data presented on a display including programs and/or applications may be part of the user interface.

In accordance with an embodiment of the invention, the detection of the movement caused by expulsion of human breath may occur without use of a channel. The detection of the movement caused by expulsion of human breath may be responsive to the expulsion of human breath into open space, which is then sensed.

In accordance with another embodiment of the invention, the MEMS sensing and processing module 104 may be enabled to navigate within the user interface of one of more of the plurality of devices, such as a handheld device, for example, a multimedia device 106a, a cellphone/smartphone/dataphone 106b, a PC, laptop or a notebook computer 106c, a display device 106d, and/or a TV/game console/other platform 106e via the generated one or more control signals. The MEMS sensing and processing module 104 may be enabled to select one or more components within the user interface of the plurality of devices via the generated one or more control signals. The generated one or more control signals may comprise one or more of a wired and/or a wireless signal.

In accordance with another embodiment of the invention, one or more of the plurality of devices, such as a handheld device, for example, a multimedia device 106a and/or a cell phone/smartphone/dataphone 106b and/or a PC, laptop or a notebook computer 106c may be enabled to receive one or more inputs defining the user interface from another device 108. The other device 108 may be one or more of a PC, laptop or a notebook computer 106c and/or a handheld device, for example, a multimedia device 106a and/or a cell phone/smartphone/dataphone 106b. In this regard, data may be transferred from the other device 108 to the cellphone/smartphone/dataphone 106b and this data may be associated or mapped to media content that may be remotely accessed by the cellphone/smartphone/dataphone 106b via a service provider such as a cellular or PCS service provider. The transferred data that is associated or mapped to media content may be utilized to customize the user interface 107b of the cellphone/smartphone/dataphone 106b. In this regard, media content associated with one or more received inputs may become an integral part of the user interface of the device being controlled. The associating and/or mapping may be performed on either the other device 108 and/or one the cellphone/smartphone/dataphone 106b. In instances where the associating and/or mapping is performed on the other device 108, the associated and/or mapped data may be transferred from the other device 108 to the cellphone/smartphone/dataphone 106b.

In an exemplary embodiment of the invention, an icon transferred from the other device 108 to the cellphone/smartphone/dataphone 106b may be associated or mapped to media content such as an RSS feed and/or a markup language, such as HTML and XML, that may be remotely accessed by the cellphone/smartphone/dataphone 106b via the service provider of the cellphone/smartphone/dataphone 106b. Accordingly, when the user 102 blows on the MEMS sensing and processing module 104, control signals generated by the MEMS sensing and processing module 104 may navigate to the icon and select the icon. Once the icon is selected, the RSS feed or markup language may be accessed via the service provider of the cellphone/smartphone/dataphone 106b and corresponding RSS feed or markup language content may be displayed on the user interface 107b. U.S. application Ser. No. 12/056,187 discloses an exemplary method and system for customizing a user interface of a device and is hereby incorporated herein by reference in its entirety.

In operation, a user 102 may exhale into open space and the exhaled breath or air may be sensed by one or more detection devices or detectors, such as one or more sensors, sensing members and/or sensing segments in the MEMS sensing and processing module 104. The MEMS sensing and processing module 104 may be enabled to detect movement caused by expulsion of human breath by the user 102. One or more electrical, optical and/or magnetic signals may be generated by one or more detection devices or detectors within the MEMS sensing and processing module 104 in response to the detection of movement caused by expulsion of human breath. The processor firmware within the MEMS sensing and processing module 104 may be enabled to process the received electrical, optical and/or magnetic signals from the one or more detection device(s) or detector(s) utilizing various algorithms and generate one or more control signals to the device being controlled, for example, the multimedia device 106a. The generated one or more control signals may be communicated to the device being controlled, for example, the multimedia device 106a via a wired and/or a wireless signal. The processor in the device being controlled may utilize the communicated control signals to control the user interface of the device being controlled, such as a user interface 107a of the multimedia device 106a, a user interface 107b of the cellphone/smartphone/dataphone 106b, a user interface 107c of the personal computer (PC), laptop or a notebook computer 106c, a user interface 107d of the display device 106d, a user interface 107e of the TV/game console/other platform 106e, and a user interface of a mobile multimedia player and/or a remote controller.

U.S. application Ser. No. 12/056,164 discloses an exemplary method and system for controlling a user interface of a device via a MEMS detector operable to detect movement of air due to expulsion of human breath, and is hereby incorporated herein by reference in its entirety.

Figure 2:
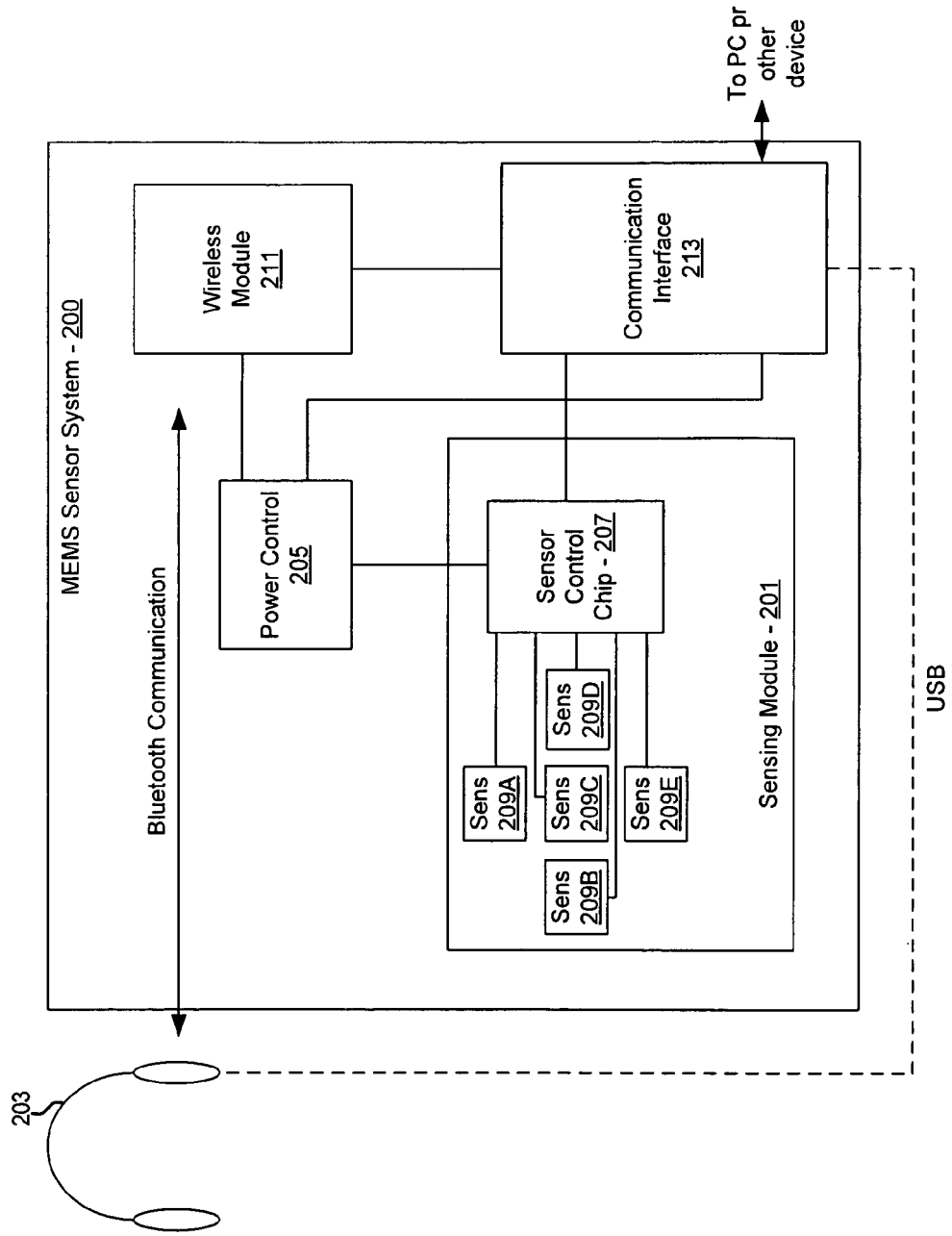
FIG. 2 is a block diagram illustrating an exemplary MEMS sensing module and Bluetooth headset, in accordance with an embodiment of the invention.

FIG. 2 is a block diagram illustrating an exemplary MEMS sensing module and Bluetooth device, in accordance with an embodiment of the invention. Referring to FIG. 2, there is shown a wireless device 203 and a micro-electro-mechanical system (MEMS) detector system 200 comprising a sensing module 201, a power control block 205, a wireless module 211, and a communication interface 213. The sensing module 201 may comprise a detector control block 207, and detectors 209A-209E.

The wireless device 203 may comprise a Bluetooth neckset, for example, that may communicate with the MEMS detector system 200 and other devices, such as the multimedia device 106a, the cellphone/smartphone/dataphone 106b, the personal computer (PC), laptop or a notebook computer 106c, the display device 106d and/or the television (TV) /game console/other platform 106e, described with respect to FIG. 1. Although a neckset is disclosed herein, the invention is not limited in this regard. For example, a MEMS detector may be integrated in, for example, a headset such as a Bluetooth headset or a headphone or other device, including a device that may be controlled. U.S. application Ser. No. 12/056,164 discloses an exemplary neckset, and is hereby incorporated herein by reference in its entirety.

The detector control block 207 may comprise suitable circuitry, logic and/or code that may enable biasing and sensing of electrical signals from the detectors 209A-209E. The detector control block 207 may be communicatively coupled to the detectors 209A-209E, the power control block 207, and the communication interface 213.

The detectors 209A-209E may be integrated as one or more portions of one or more MEMS devices that may enable the detection of various velocities of air flow from a user's breath. In an embodiment of the invention, deflectable MEMS members in the detectors 209A-209E may be deflected by the air flow and block an emitted light reflected off the deflectable MEMS members to a plurality of detectors. The number and type of sources and detectors is not limited to the number shown in FIG. 2. Accordingly, any number of detectors and sources may be utilized according to desired size, sensitivity, and/or resolution. Similarly, the type of sources and detectors may comprise other sensing mechanisms, other than visible light. For example, piezoelectric, ultrasonic, Hall effect, electrostatic, and/or permanent or electromagnetic detectors may be activated by deflected MEMS members to generate a signal to be communicated to the detector control chip 207. Exemplary optical MEMS detectors are described further at least with respect to FIGS. 3-9.

The power control block 205 may comprise suitable circuitry, logic, and/or code that may enable powering various circuitry of the MEMS detector system 200. The power control block 200 may enable charging of batteries that may be integrated within the power control block 205, the BT module 211, or the sensing control module 201, for example, and may then control power usage during battery operation.

The wireless module 211 may comprise suitable circuitry, logic and/or code for communicating wirelessly with wireless devices, such as the wireless device 203. The wireless module 211 may comprise Bluetooth, Zigbee, WLAN and variants thereof, or other wireless protocol transmit and receive capabilities for control signals that may be generated by the sensing module 201 and feedback signals from the wireless device 203. The wireless module may be communicatively coupled with the communication interface 213. A wired connection such as a cable may also be utilized to communicate with the device 203.

The communication interface 213 may comprise suitable circuitry, logic, and/or code that may enable wired communication between the MEMS detector system 200 and external devices such as a personal computer, for example. The communication interface 213 may be enabled to switch signals generated by the sensing module 201 to the wireless module 211 or an external device through a wired connection to the communication interface 213. The communication interface 213 may comprise universal asynchronous receiver/transmitter (UART) and/or inter integrated circuit (I2C) interface capability, for example.

In operation, the detectors 209A-209E may sense air flow due to expulsion of air, for example, air from a user's breath, and may generate signals that may be communicated to the wireless device 203 via the detector control chip 207, the communication interface 213 and the wireless module 211. The power control block 205 may provide proper detector 209A-209E biasing conditions, and may provide power for the MEMS detector module 200 when under battery power. The user interaction with the sensing module 201 may allow for hands-free or one-hand control of a wireless device, such as the wireless devices, the multimedia device 106a, the cellphone/smartphone/dataphone 106b, the personal computer (PC), laptop or a notebook computer 106c, the display device 106d and/or the television (TV)/game console/other platform 106e, described with respect to FIG. 1.

Figure 3:
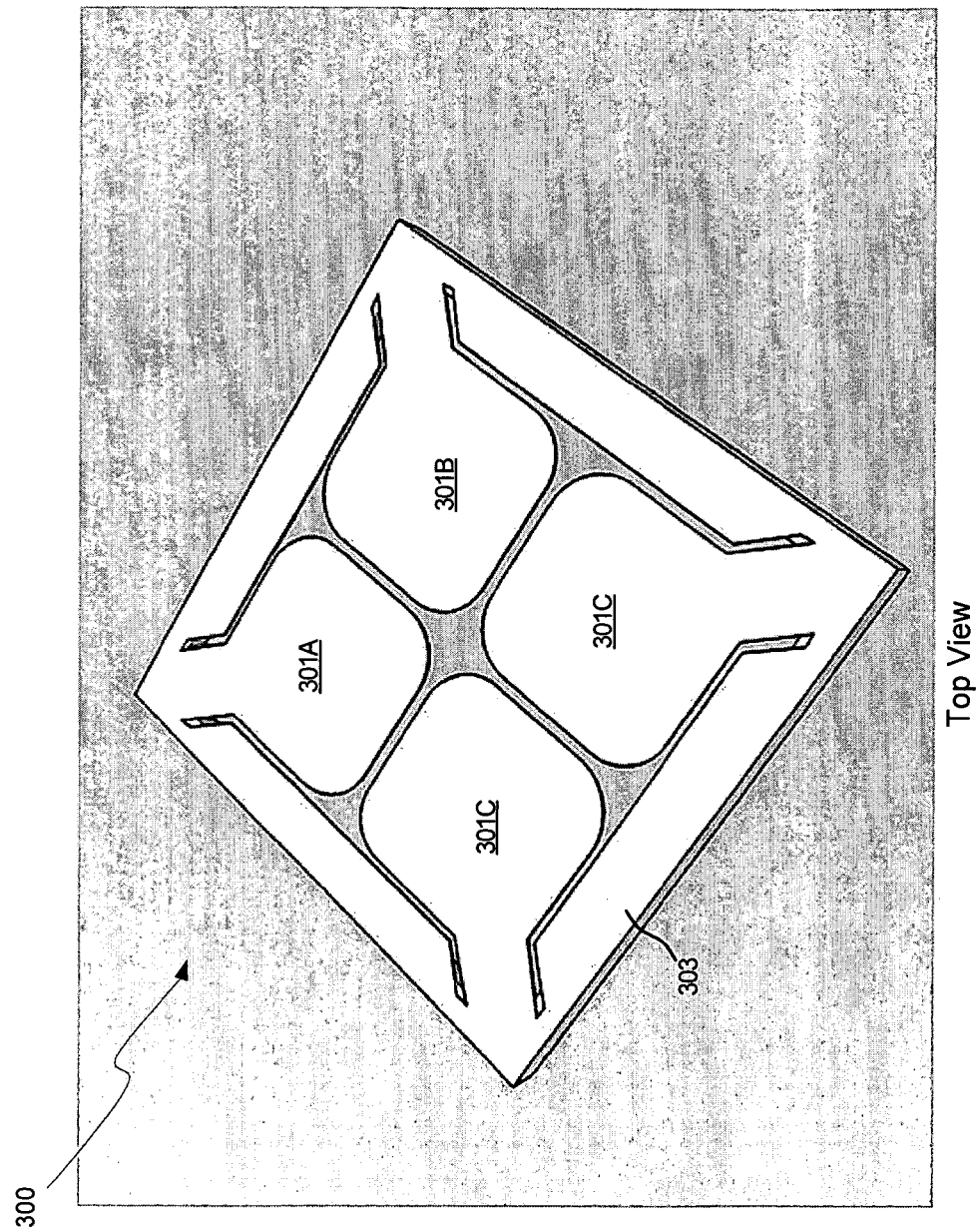
FIG. 3 is a block diagram illustrating an exemplary MEMS deflectable member structure, in accordance with an embodiment of the invention.

FIG. 3 is a block diagram illustrating an exemplary MEMS deflectable member structure, in accordance with an embodiment of the invention. Referring to FIG. 3, there is shown a MEMS member array 300 comprising the deflectable members 301A-301D and the support structure 303. The deflectable members 301A-301D may also be referred to as moveable members or segments. In an embodiment of the invention, the MEMS member array 300 may comprise a micro-machined silicon (Si) structure, such that the thickness of the deflectable members 301A-301D may be physically deflected by air flow without breaking. The MEMS member array 300 may be fabricated utilizing MEMS techniques, such as anisotropic etching, for example.

The support structure 303 may comprise a rigid support structure that may suspend the deflectable members 301A-301D and may enable the MEMS member array 300 to be integrated within a detector package, as described, for example, at least with respect to FIG. 5-8.

In operation, the deflectable members 301A-301D may be deflected or moved by air flow resulting from the expulsion air, for example, air from a user's breath. In an embodiment of the invention, a light source may be reflected off of the bottom surface of the deflectable members 301A-301D, such that the amount of deflection may be determined by measuring a light signal received from the reflection off of each of the deflectable members 301A-301D. In various embodiments of the invention, the source and detectors to determine the deflection of the deflectable members 301A-301D may utilize other sensing techniques such as piezoelectric, Hall effect, ultrasonic, magnetic, or electrostatic, for example. In instances where a piezoelectric technique may be utilized, the deflection of the deflectable members 301A-301D may generate an electrical signal proportional to the applied air flow by compressing a piezoelectric material. In another embodiment of the invention, a capacitance value may be adjusted by the deflection of the deflectable members 301A-301D, with the change in capacitance generating an electrical signal. In yet another embodiment of the invention, permanent magnets or electromagnets may be utilized adjacent to or on the surface of said deflectable members 301A-301D to generate a current proportional to the speed of the air flow. Thus, the measurement technique is not limited to optical measurements. Accordingly, a variety of deflection measurement techniques may be utilized.

Figure 4:
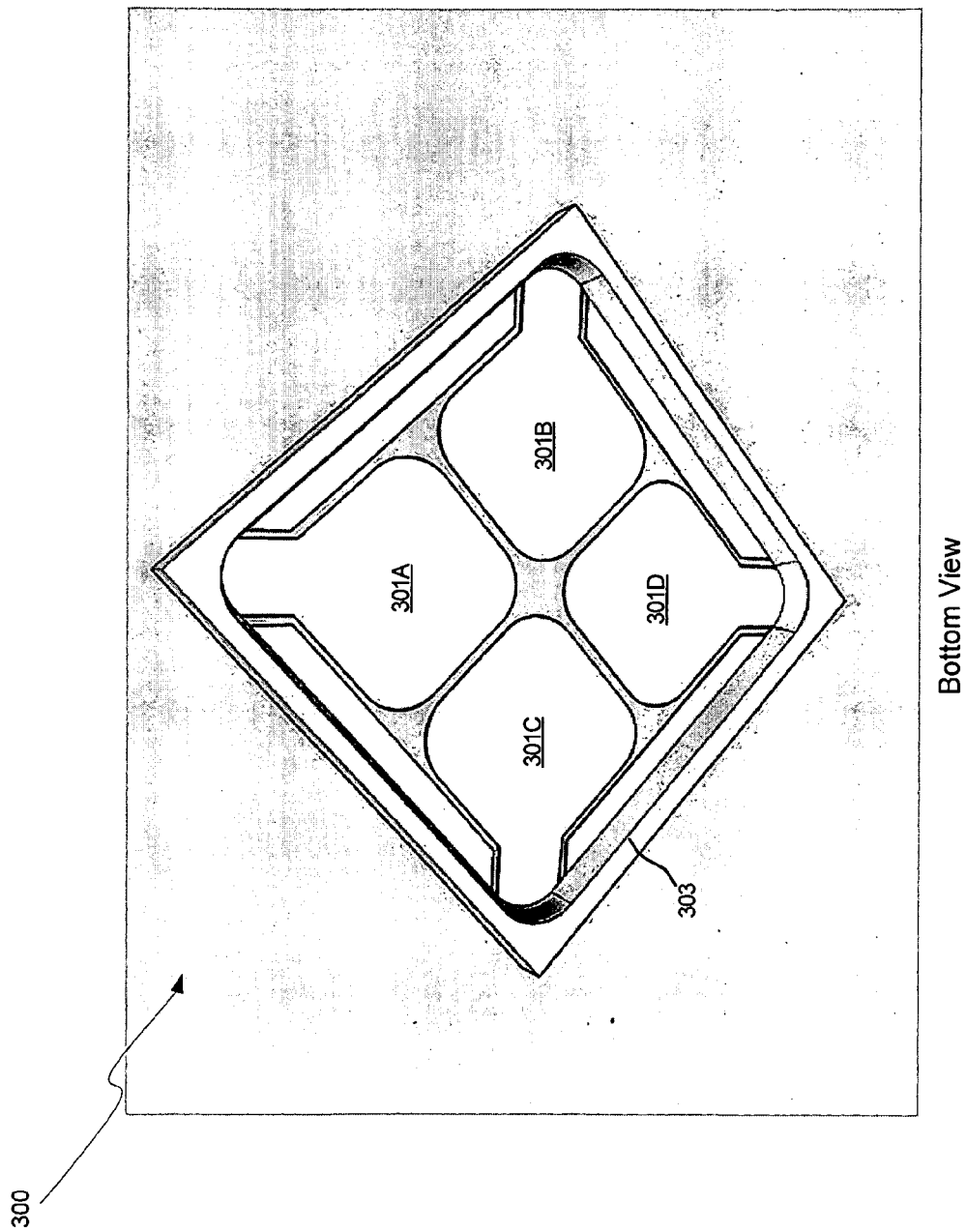
FIG. 4 is a block diagram illustrating a top view of an exemplary MEMS deflectable member structure, in accordance with an embodiment of the invention.

FIG. 4 is a block diagram illustrating a top view of an exemplary MEMS deflectable member structure, in accordance with an embodiment of the invention. Referring to FIG. 4, there is shown the MEMS member array 300 comprising the deflectable members 301A-301D and the support structure 303. The vertical thickness of the support structure 303 may enable the suspension of the deflectable members 301A-301D above a stopper structure, as described at least with respect to FIGS. 6-9. Additionally, the stopper structure may decrease and/or eliminate the possibility of one or more of the deflectable members 301A-301D from being over-deflected, and possibly breaking.

In operation, the deflectable members 301A-301D may be deflected by air flow from a user's breath. In an embodiment of the invention, a light source may be reflected off the bottom surface of the deflectable members 301A-301D, such that the amount of deflection may be determined by measuring a light signal received from the reflection off of each of the deflectable members 301A-301D. In various embodiments of the invention, the source and detectors to determine the deflection of the deflectable members 301A-301D may utilize other sensing techniques such as piezoelectric, Hall effect, ultrasonic, magnetic, or electrostatic, for example.

Figure 5:
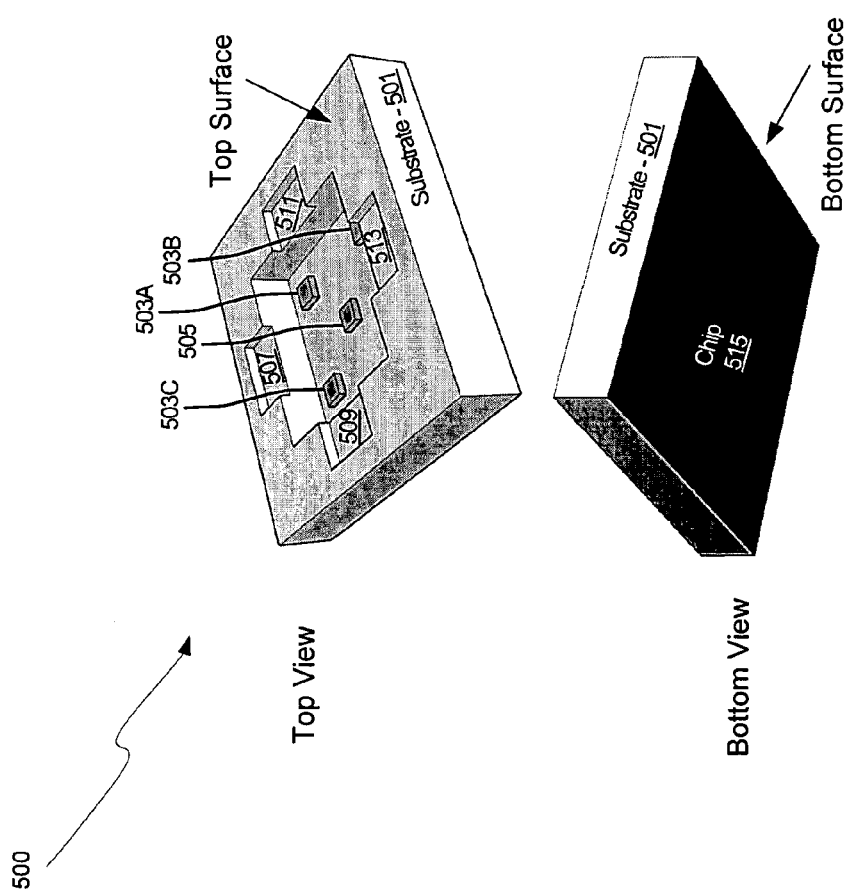
FIG. 5 is a block diagram of an exemplary ceramic module for a MEMS detector array, in accordance with an embodiment of the invention.

FIG. 5 is a block diagram of an exemplary ceramic module for a MEMS detector array, in accordance with an embodiment of the invention. Referring to FIG. 5, there is shown a substrate 501, detectors 503A-503C, a source 505, vent openings 507, 509, 511, and 513, and an integrated circuit 515. A fourth detector, not shown, may be integrated within the cavity in the substrate 501. The number of sources and detectors is not limited to the number shown in FIG. 5.

The substrate 501 may comprise a machined block of low temperature co-fired ceramic or other insulating material, for example, and may act as a substrate support for the MEMS member array 300 described with respect to FIGS. 3 and 4, as well as the detectors 503A-503C, the source 505, and the integrated circuit (IC) 515. Accordingly, any number of detectors and sources may be utilized according to the desired size, sensitivity, and resolution desired. The cavity in the top surface of the substrate 501 may be utilized to create a plurality of individual cavities that may each correspond to a deflectable member of the MEMS member array 300. The cavity may be punched, chemically etched, milled, or laser machined, for example, in the substrate 501, depending on the type of substrate material.

In an embodiment of the invention, the substrate 501 may instead comprise a block of micro-machined silicon. Utilizing silicon may enable the use of semiconductor micro-machining techniques, such as anisotropic etching via wet chemical or plasma etches, and/or ion beam milling, for example, for a uniform and controllable fabrication process. In this manner, the detectors 503A-503C and the source 505 may be fabricated directly on the substrate 501 via semiconductor doping techniques such as diffusion or ion implantation, for example. In another embodiment of the invention, the detectors 503A-503C and the source 505 may be epitaxially grown on the substrate 501.

Additionally, the substrate 501 may comprise multiple layers of material comprising insulating, semiconducting, and conducting material to enable the fabrication of passive devices as well as interconnection between various devices integrated within and on the substrate 501. Conducting material within and on the substrate 501 may comprise conductive ink that may enable a cost effective method of interconnecting devices within a plane of the substrate 501. For example, a conductive ink pattern may be deposited on the large cavity in the top surface of the ceramic to provide interconnect between the detectors 503A-503C, the source 505 and interconnect lines that may extend through the substrate 501 to the IC 515 coupled to the bottom surface of the substrate 501. Furthermore, another patterned conductive layer may be deposited on, for example, an inner section of the cavity and/or the bottom layer of the substrate 501 to enable connection to the IC 515.

The detectors 503A-503C may comprise semiconductor photodiodes or photoconductors that may be operable to sense light reflected off of deflectable members in the MEMS member array 300 that may be placed on top of the substrate 501, as described, for example, at least with respect to FIGS. 6-10. The detectors 503A-503C may be electrically coupled to the substrate 501 via conductive ink, for example, and may be mechanically coupled to the substrate 501 via thermal epoxy, for example.

The source 505 may comprise a semiconductor light emitting diode (LED) or laser that may be enabled to emit light in the vertical direction in relation to the bottom of the large cavity in the top surface of the substrate 501. The source 505 may emit visible or invisible light, for example, for detection by the detectors 503A-503C.

The type of sources and detectors may comprise other sensing mechanisms, other than visible light. For example, electro-chemical, piezoelectric, ultrasonic, Hall effect, electrostatic, and/or permanent or electromagnet detectors may be activated by deflected MEMS members in the MEMS member array 300.

The IC 515 may comprise suitable circuitry, logic, and/or code that may be enabled to bias and receive signals from the detectors 503A-503C and bias the source 505. In addition, the IC 515 may comprise processing capabilities for processing signals received from the detectors 503A-503C before communicating signals to other components in the MEMS detector system 200.

In operation, the source may be enabled via biasing conditions generated by the IC 515 to generate a desired light intensity. In instances where photodiodes may be used for the detectors 503A-503C, they may also be supplied a bias voltage via the IC 515. The light emitted by the source 505 may be reflected and/or blocked by deflectable members in the MEMS member array 300 described with respect to FIGS. 3 and 4.

The amount of light received by each detector may indicate the amount of deflection of each deflectable member of the MEMS member array 300. The deflection of the deflectable members of the MEMS member array 300 may be caused by air flow from the breath of a user for controlling a handheld device, for example. The vent openings 507, 509, 511, and 513 may reduce and/or eliminate pressure vortices/buildup in the cavity in the top surface of the substrate 501. Pressure vortices/buildup may adversely affect the deflection of the deflectable members of the MEMS member array 300, introducing noise to the generated signal.

The received light intensity may be converted to an electrical signal by the detectors 503A-503C, which may be communicated to the IC 515 via conductive channels in the substrate 501. The IC 515 may enable the communication of the deflection of the deflectable member of the MEMS member array 300 to a wireless device, such as the wireless device 203 or other wireless devices such as the multimedia device 106a, the cellphone/smartphone/dataphone 106b, the personal computer (PC), laptop or a notebook computer 106c, the display device 106d and/or the television (TV)/game console/other platform 106e. In this manner, a user may use their breath to control a wireless device either hands-free or via one hand.

Figure 6:
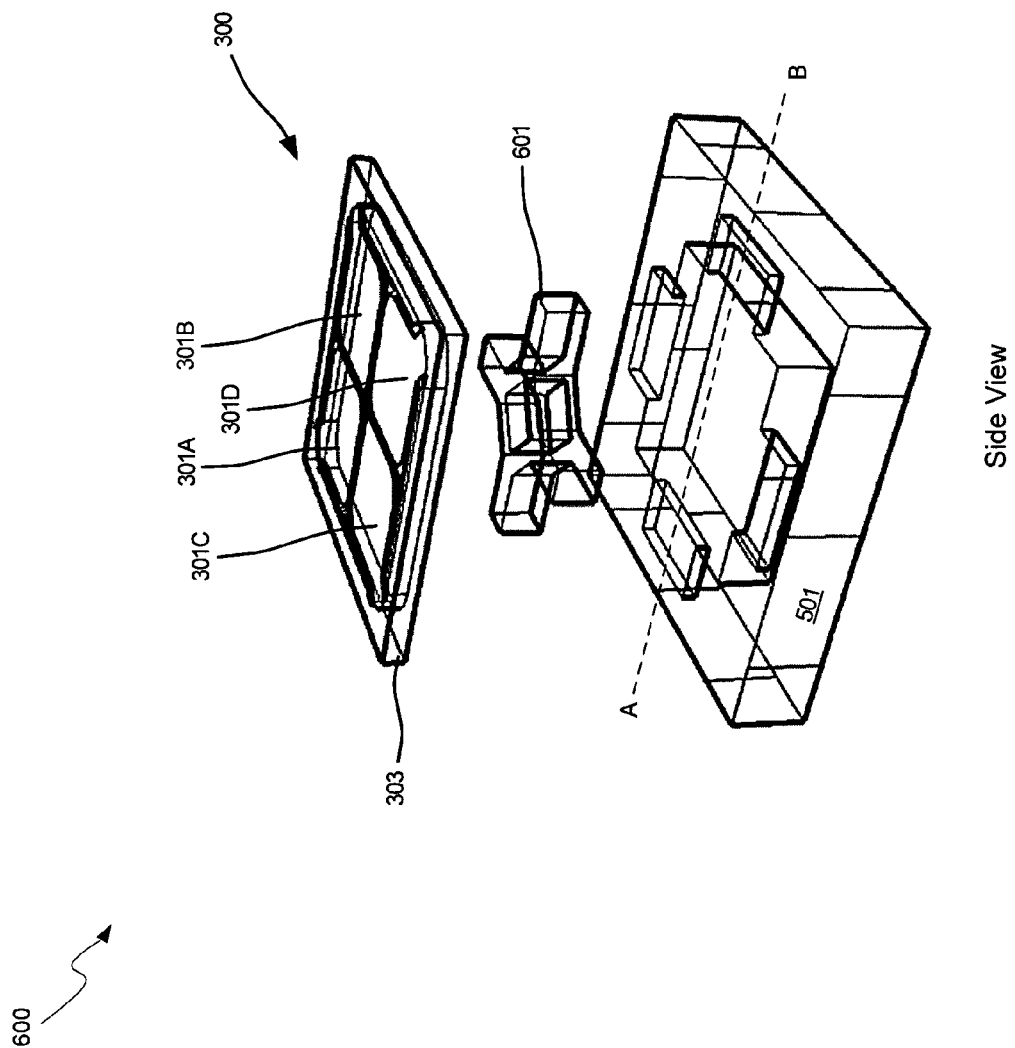
FIG. 6 is a block diagram of an exemplary MEMS detector module, in accordance with an embodiment of the invention.
Figure 8:
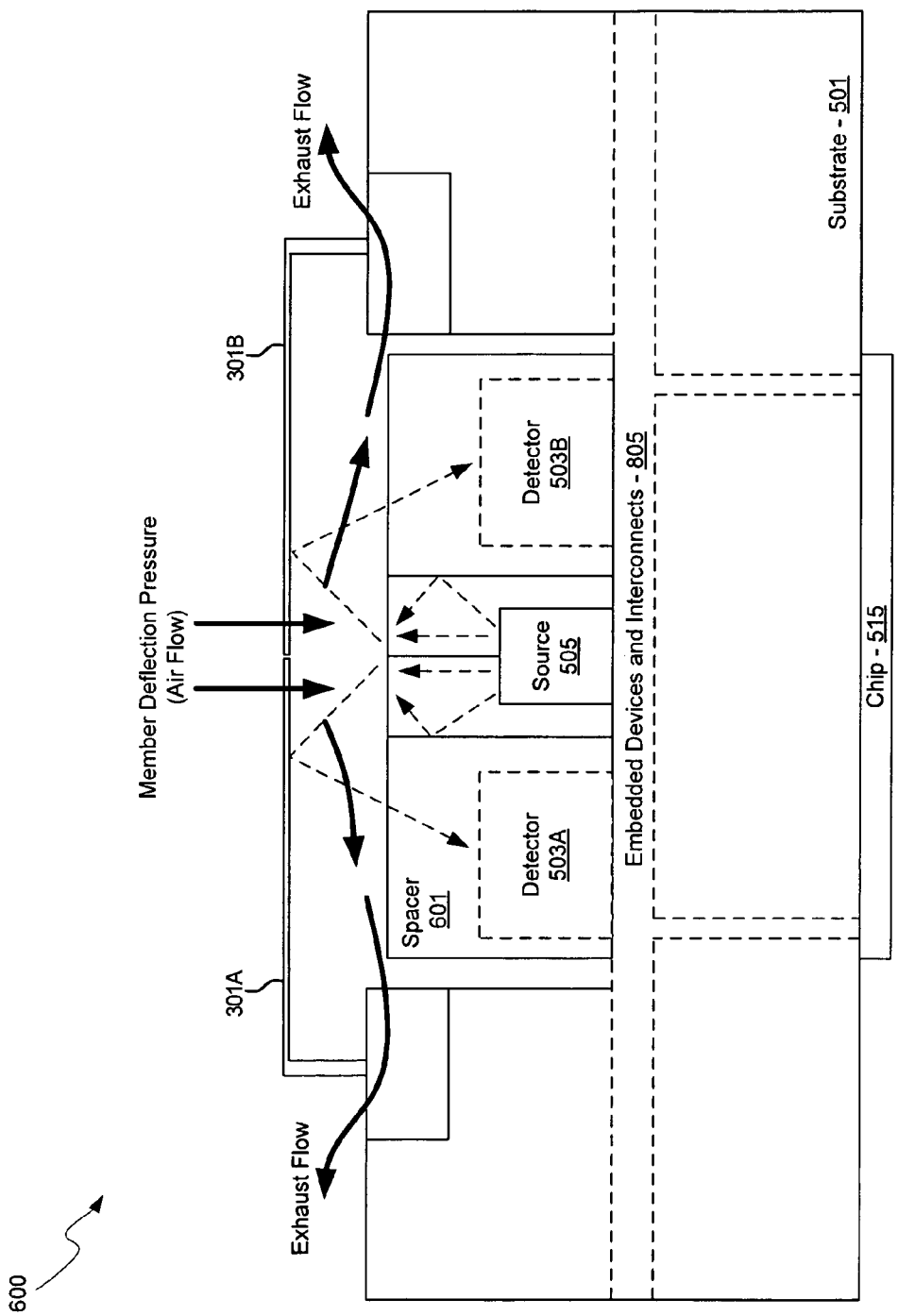
FIG. 8 is a block diagram illustrating an exemplary MEMS detector module cross-section, in accordance with an embodiment of the invention.

FIG. 6 is a block diagram of an exemplary MEMS detector module, in accordance with an embodiment of the invention. Referring to FIG. 6, there is shown a MEMS detector module 600 comprising the MEMS member array 300, the substrate 501, and a spacer 601. The MEMS member array 300 and the substrate 501 may be as described with respect to FIGS. 3 and 5. The dashed line AB illustrates the plane in which the cross-sectional view of FIG. 8 is taken.

The spacer 601 may comprise a "cross" shaped structure that may enable the creation of individual cavities between the deflectable members of the MEMS member array 300 and the substrate 501. The spacer may comprise Teflon, for example, and may also provide a stopping mechanism to avoid over-deflection of the deflectable members of the MEMS member array 300. The spacer 601 may create a chamber around the source, such as the source 505, and may also isolate the sensing mechanisms, described with respect to FIG. 5, from each other. In addition, the middle section of the spacer 601 may be open to allow for the emission of light from the source 505 that may be bonded to the middle of the large cavity in the top surface of the substrate 501, as described with respect to FIGS. 5 and 8.

In operation, the deflectable members of the MEMS member array 300 may be deflected by air flow from a user's breath. At full deflection, the deflectable members may be pressed against the stopper 601, such that the sensing mechanisms, described with respect to FIG. 5, may sense a minimum light intensity.

Figure 7:
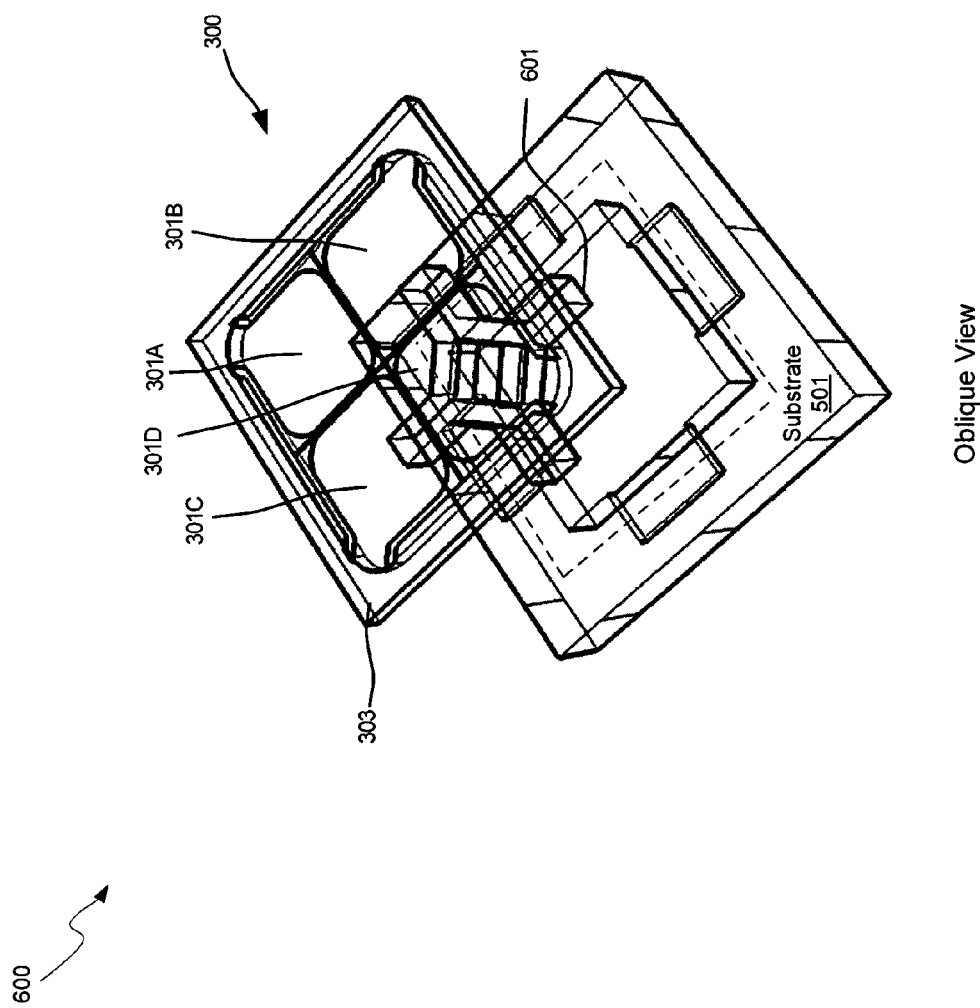
FIG. 7 is a block diagram of an oblique angle view of an exemplary MEMS detector module, in accordance with an embodiment of the invention.

FIG. 7 is a block diagram of an oblique angle view of an exemplary MEMS detector module, in accordance with an embodiment of the invention. Referring to FIG. 7, there is shown the MEMS detector module 600 comprising the MEMS member array 300, the substrate 501, and the spacer 601, and each are as described with respect to FIG. 6. The dashed line on the top surface of the substrate 501 may correspond to the exemplary placement of the MEMS member array 300.

In operation, the deflectable or moveable members of the MEMS member array 300 may be deflected by air flow from a user's breath. At full deflection, the deflectable members may be pressed against the stopper 601, such that the sensing mechanisms, described with respect to FIG. 5, may sense a minimum light intensity. The MEMS members may be opaque to light in the frequency of light utilized for sensing.

FIG. 8 is a block diagram illustrating an exemplary MEMS detector module cross-section, in accordance with an embodiment of the invention. Referring to FIG. 8, there is shown the MEMS detector module 600 comprising the deflectable members 301A and 301B, the substrate 501, the detectors 503A and 503B, the source 505, the IC 515, the spacer 601, and embedded devices and interconnects 805. The deflectable members 301A and 301 B, the substrate 501, the detectors 503A and 503B, the source 505, the IC 515, and the spacer 601 are as described with respect to FIGS. 3-6.

The embedded devices and interconnects 805 may comprise conducting and/or semiconducting materials embedded within the substrate 501 that may create discrete devices and/or device interconnects. For example, conductive ink may be utilized to create device interconnects. The embedded devices and interconnects 805 may enable proper biasing conditions for the detectors 503A and 503B and the source 505, and may also provide electrical interconnects to the IC 515.

In operation, air flow, which may result from the expulsion of air, for example, from a user's breath, may deflect or move the deflectable members 301A and 301 B. The source 505 may generate a light signal that may reflect off of the deflectable members 301A and 301B. The members may be reflective to light in the frequency being utilized for sensing. In instances where there is no deflection, the reflected light signals received by the detectors 503A and 503B may be a maximum, and may be utilized to calibrate the MEMS detector system 200, described with respect to FIG. 2, at startup, or on a periodic basis. In instances when the deflectable members 301A and 301B may be fully deflected against the spacer 601, the light signal received by the detectors 503A and 503B may be zero, or a minimum level, to indicate maximum deflection. This process is described further with respect to FIG. 9.

The reflected light received by the detectors 503A and 503B may generate electrical signals that may be communicated to the IC 515 via the embedded devices and interconnects 805.

Figure 9:
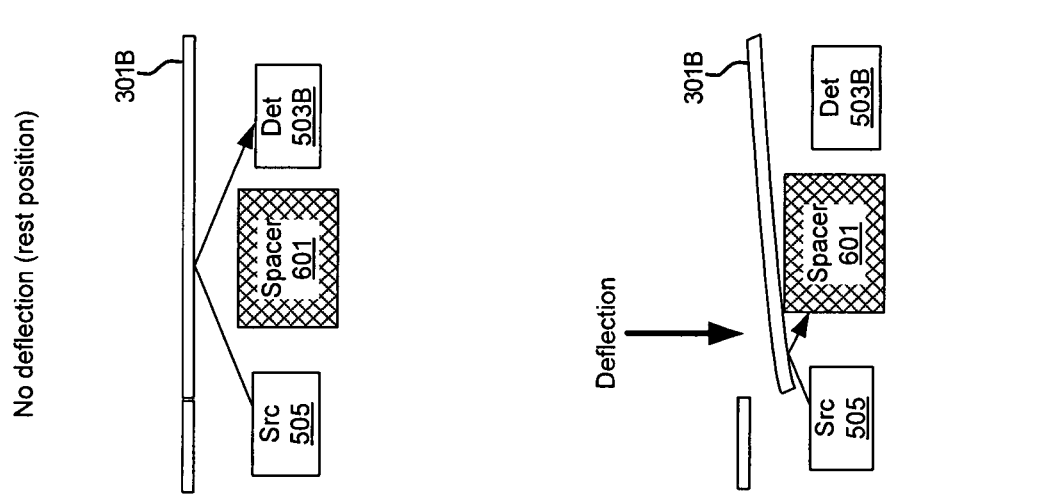
FIG. 9 is a block diagram illustrating an exemplary MEMS member deflection, in accordance with an embodiment of the invention.

FIG. 9 is a block diagram illustrating an exemplary MEMS member deflection, in accordance with an embodiment of the invention. Referring to FIG. 9, there is shown the deflectable member 301 B, the detector 503B, the source 505, and the spacer 601. The deflectable member 301 B, the detector 503B, the source 505, and the spacer 601 may be as described with respect to FIGS. 3-6.

In operation, in instances where there is no air flow being directed at the detector module 600, the deflectable member 301B may be in a rest position, as shown in the No Deflection, or upper figure, of FIG. 9. The source 505 may emit a light signal at the deflectable member 301B, with the light signal reflecting off of the deflectable member 301B and onto the detector 503B. This signal measured at no deflection may comprise a calibration value which may be measured at startup or on a periodic basis. Calibration may be utilized to discard a certain portion of the range of sensing. The reflection range may be controlled using artificial intelligence (AI) techniques, for example.

In instances where an air flow is directed at the detector module 600, the deflectable member 301B may be deflected. In instances where the air flow may be high, the deflectable member 301B may be deflected until it may be pressed against the spacer 601, which may represent the maximum flow, above which the MEMS detector assembly 600 may not differentiate. In this instance, the light emitted by the source 505 may be blocked completely, and a zero or minimum signal may be received by the detector 503B. The amount of deflection of the deflectable member, and thus the signal generated by the detector 503B, may correspond to the velocity of the air flow causing the deflection.

In an embodiment of the invention, the thickness and/or area of each deflectable member 301A-301D may be configured for a desired maximum air flow. In addition, the thickness of the spacer 601 may be configured to allow a desired amount of deflection of the deflectable members 301A-301D.

Figure 10:
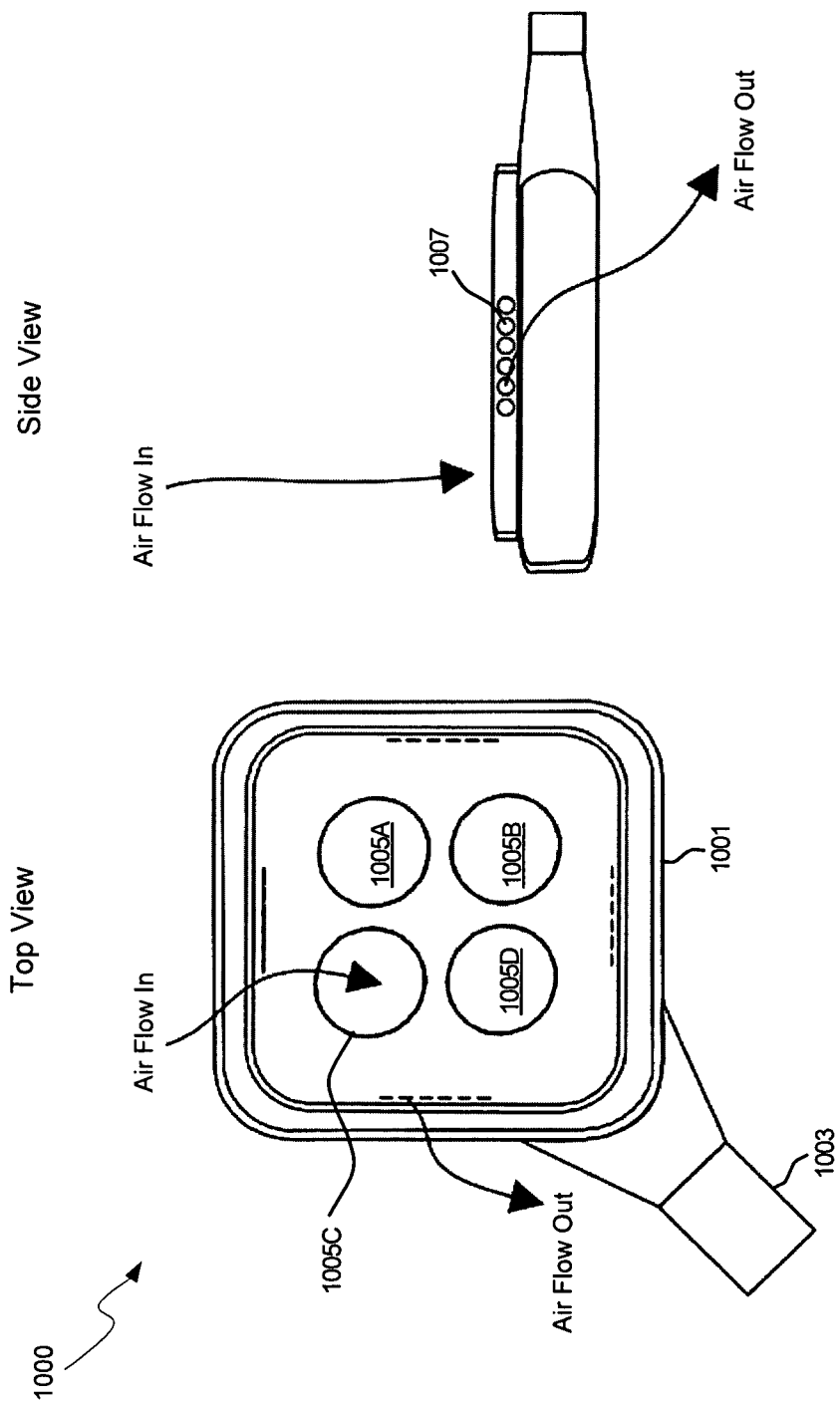
FIG. 10 is a block diagram of an exemplary air flow detector assembly, in accordance with an embodiment of the invention.

FIG. 10 is a block diagram of an exemplary air flow detector assembly, in accordance with an embodiment of the invention. Referring to FIG. 10, there is shown an air flow detector assembly 1000 which may comprise the MEMS detector assembly 600 within an enclosure 1001 mechanically coupled to a support member 1003 designed for user operation. The enclosure 1001 may comprise, for example four sets of exhaust holes 1007 which may align with the vent openings 507, 509, 511, and 513, described with respect to FIG. 5, and may also comprise four inlet holes 1005A-1005D that may align with the deflectable members 301A-301D. The exhaust holes may be aligned in such a manner as to prevent a user from blowing through the exhaust holes during normal operation.

In operation, air flow may enter in the inlets 1005A-1005D, follow the path within the enclosure 1001 as described with respect to FIG. 8, and then exit the enclosure 1001 through one or more of the exhaust holes 1007. In this manner, pressure vortices or pressure buildups, which may adversely affect detector signals, may be reduced or eliminated within the enclosure 1001.

Figure 11:
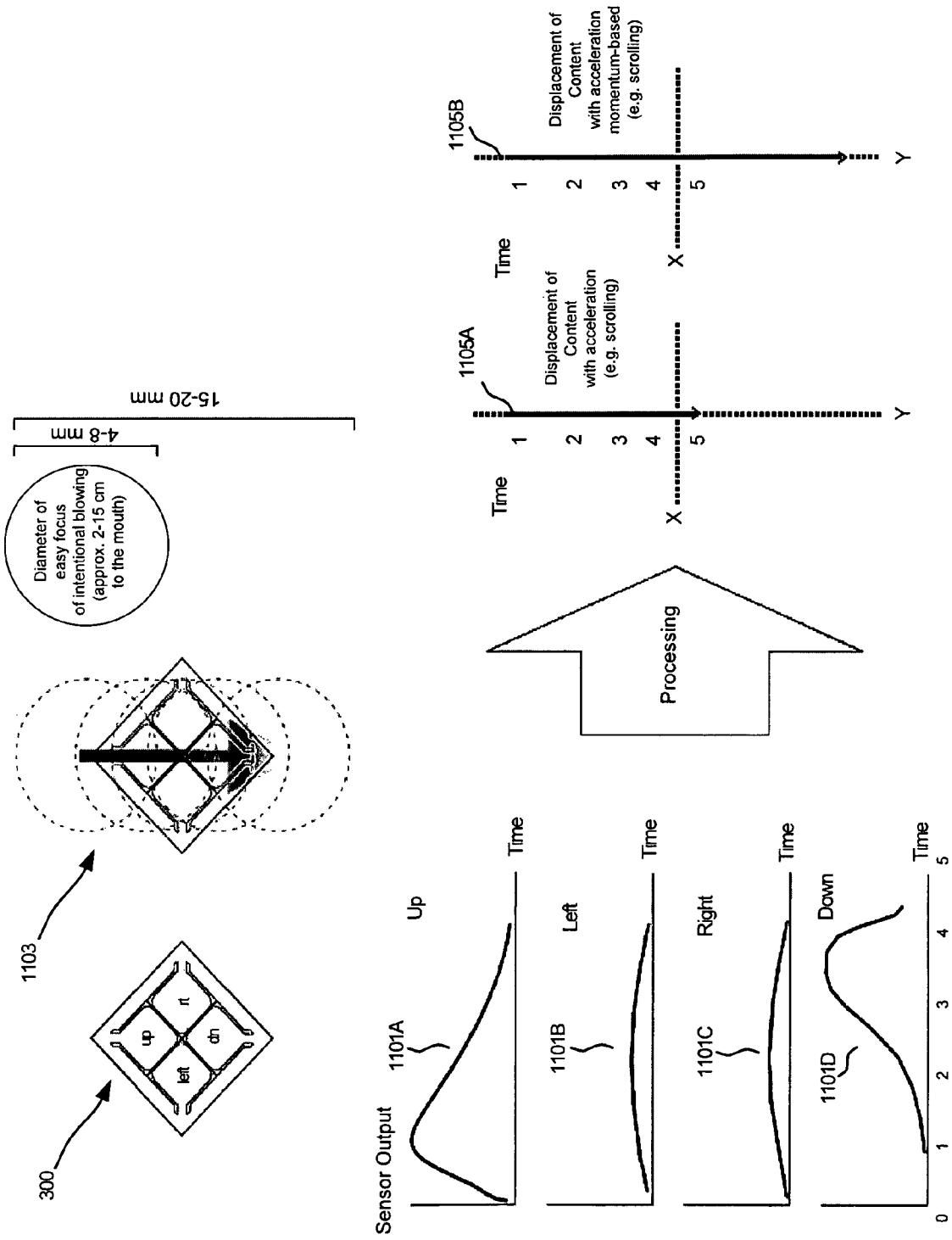
FIG. 11 is a block diagram illustrating the kinetic sensing operation of the MEMS detector, in accordance with an embodiment of the invention.

FIG. 11 is a block diagram illustrating the kinetic sensing operation of the MEMS detector, in accordance with an embodiment of the invention. Referring to FIG. 11, there is shown the MEMS member array 300, detector output plots 1101A-1101D, an exemplary blowing pattern 1103, and resulting control actions 1105A and 1105B. The MEMS member 300 is as described with respect to FIG. 3.

The exemplary blowing pattern 1103 signifies that pattern of blowing a user may direct at the MEMS member array 300. In this instance, the exemplary blowing pattern 1103 moves in the downward direction across the MEMS member array 300, resulting in the detector output plots 1101A-1101D for each of the deflectable members. The detector plot 1101A indicates the detector signal versus time, indicating that the detector under the "up" deflectable member is deflected first, followed by both the "left" and "right" deflectable members, and lastly the "down" deflectable member. These signals may be processed, in the IC 515, for example, to result in a desired action as shown by the resulting control actions 1105A and 1105B. The control action 1105A may indicate that the user intended to scroll content downward, and in control action 1105B, the scrolling down may be momentum-based, resulting in a higher scrolling rate.

Figure 12:
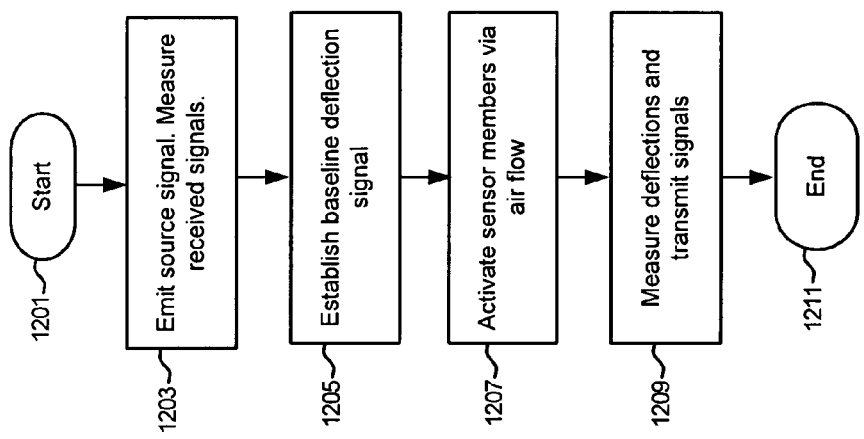
FIG. 12 is a flow diagram illustrating an exemplary MEMS detector utilization process, in accordance with an embodiment of the invention.

FIG. 12 is a flow diagram illustrating an exemplary MEMS detector utilization process, in accordance with an embodiment of the invention. Referring to FIG. 12, in step 1203, after start step 1201, the source 505 may emit a signal with no deflection of the deflectable members 301A-301D. In step 1205, the baseline deflection signal and noise level may be determined from the reflected signal. In step 1207, the MEMS detector assembly 600 may be activated by air flow. In step 1209, the reflected signals from the deflectable members 301A-301D may be measured and the signal may be transmitted to a wireless device that may be controlled by the MEMS detector assembly 1000, followed by end step 1211.

In an exemplary embodiment of the invention, a method and system are disclosed for a MEMS detector 600 that enables control of a device using human breath and may comprise detecting movement of air caused by, for example, expulsion of human breath via a microelectromechanical systems (MEMS) detector 600. The MEMS detector 600 may comprise one or more deflectable or moveable members 301A-301D operable to detect the movement of air caused by the expulsion of human breath. The deflection of the deflectable or moveable members 301A-301D may be limited via a spacer 601 within the MEMS detector 600. The amount of deflection of the deflectable or moveable members 301A-301D may be determined by measuring light signals reflected off of the MEMS deflectable members 301A-301D, measuring piezoelectric signals generated by the deflection of the deflectable members 301A-301D, measuring capacitance changes generated by the deflection of the deflectable members 301A-301D, or by measuring current generated by the deflection of the deflected members 301A-301D in a magnetic field. One or more output signals may be generated based on the detected movement. The MEMS detector 600 may comprise a substrate 501, a spacer 601, and the MEMS deflectable members 301A-301D. The substrate 501 may comprise a ceramic material and/or silicon, and may comprise embedded devices and interconnects 805. An integrated circuit 515 may be electrically coupled to the substrate 501. Air flows may be directed out the side of the MEMS detector 600.

Certain embodiments of the invention may comprise a machine-readable storage having stored thereon, a computer program having at least one code section for a MEMS detector that enables control of a device using human breath, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for detecting expulsion of human breath, the system comprising:
   one or more micro-electromechanical system detectors for detecting movement of air caused by expulsion of human breath, wherein each micro-electromechanical system detector comprises:
   one or more deflectable members;
   a spacer situated beneath said deflectable members, said spacer having a surface in spaced relation from and facing said one or more deflectable members and wherein said spacer is attached to a substrate comprising one or more layers of conducting, semiconducting, and/or insulating layers; and
   one or more deflection detectors attached to said substrate, each deflection detector physically separated from and located proximate to a corresponding one of the one or more deflectable members.

2. The system according to claim 1, wherein said one or more deflectable members are operable to detect said movement of air caused by said expulsion of human breath.

3. The system according to claim 2, wherein said one or more micro-electromechanical system detectors determine said deflection of said deflectable members by measuring light signals reflected off of said deflectable members.

4. The system according to claim 2, wherein said one or more micro-electromechanical system detectors determine said deflection of said deflectable members by measuring piezoelectric signals generated by said deflection of said deflectable members.

5. The system according to claim 2, wherein said one or more micro-electromechanical system detectors determine said deflection of said deflectable members by measuring capacitance changes generated by said deflection of said deflectable members.

6. The system according to claim 2, wherein said one or more micro-electromechanical system detectors determine said deflection of said deflectable members by measuring current generated by said deflection of said deflectable members in a magnetic field.

7. The system according to claim 1, wherein said movement of air flows out a side of said one or more micro-electromechanical system detectors.

8. The system according to claim 1, wherein said one or more micro-electromechanical system detectors generate one or more output signals based on said detected movement.

9. The system according to claim 1, wherein said substrate comprises a ceramic material and/or silicon.

10. The system according to claim 1, wherein said substrate comprises embedded devices and interconnects.

11. The system according to claim 1, wherein an integrated circuit comprising one or more circuits is electrically coupled to said substrate.

12. The system according to claim 11, wherein said one or more circuits are disposed within and/or on said substrate.

13. A micro-electromechanical system air flow detector, said micro-electromechanical system air flow detector comprising:
   one or more deflectable members;
   a spacer situated beneath said deflectable members, said spacer having a surface in spaced relation from and facing said one or more deflectable members and wherein said spacer is attached to a substrate comprising one or more layers of conducting, semiconducting, and/or insulating layers;
   one or more deflection detectors in individual cavities beneath each of said deflectable members; and
   an integrated circuit electrically coupled to said substrate and said deflection detectors.

14. The detector according to claim 13, wherein said deflection detectors comprise a light source and one or more photodiodes.

15. The detector according to claim 13, wherein said conducting, semiconducting, and/or insulating layers comprise embedded devices and/or interconnects electrically coupled to said integrated circuit and said deflection detectors.

16. The detector according to claim 13, wherein said deflection detectors utilize one or more of: piezoelectric, ultrasonic, Hall effect, capacitance, magnetic and electromagnetic field measurement techniques.

17. The detector according to claim 13, wherein said spacer defines said individual cavities beneath each of said deflectable members.

18. The detector according to claim 13, wherein said substrate defines a bottom surface for said individual cavities.

19. The detector according to claim 13, wherein said spacer defines a deflection limit for said deflectable members.

20. The system according to claim 1, wherein deflection of each of said deflectable members causes generation of an electrical signal proportional to an applied flow upon said deflectable members.

21. The detector according to claim 13, wherein deflection of each of said deflectable members causes generation of an electrical signal proportional to an applied flow upon said deflectable members.

22. The detector according to claim 21, wherein the electrical signal is an electrical current.

* * * * *